(12) United States Patent  (10) Patent No.: US 8,678,294 B2
Maus  (45) Date of Patent: Mar. 25, 2014

(54) FEDERATED ID SECURE VIRTUAL TERMINAL EMULATION SMARTCARD

(75) Inventor: Christopher T. Maus, Sandpoint, ID (US)

(73) Assignee: LifeNexus, Inc., San Francisco, CA (US)

( * ) Notice: Subject to any disclaimer, the term of this patent is extended or adjusted under 35 U.S.C. 154(b) by 0 days.

(21) Appl. No.: 13/549,395

(22) Filed: Jul. 13, 2012

(65) Prior Publication Data

US 2012/0273578 A1 Nov. 1, 2012

Related U.S. Application Data

(63) Continuation of application No. 12/193,646, filed on Aug. 18, 2008, now abandoned.

(60) Provisional application No. 60/956,506, filed on Aug. 17, 2007.

(51) Int. Cl.
*G06K 19/06* (2006.01)
*G06K 5/00* (2006.01)
*G06K 9/00* (2006.01)

(52) U.S. Cl.
USPC ........... 235/492; 235/380; 235/382; 382/115; 382/119

(58) Field of Classification Search
USPC ......... 235/492, 493, 382, 379, 380, 439, 440; 705/16–18, 21, 35, 39, 41, 44, 65, 67, 705/72; 340/5.4, 5.41, 5.42, 5.8, 5.81, 5.82, 340/5.83, 5.85, 5.52, 5.53, 5.54; 382/115–119, 124
See application file for complete search history.

(56) References Cited

U.S. PATENT DOCUMENTS

| | | | |
|---|---|---|---|
| 4,684,791 A * | 8/1987 | Bito | 235/380 |
| 4,697,073 A * | 9/1987 | Hara | 235/487 |
| 5,590,197 A | 12/1996 | Chen et al. | |
| 6,002,783 A * | 12/1999 | Obata et al. | 382/119 |
| 6,193,152 B1 * | 2/2001 | Fernando et al. | 235/380 |
| 6,494,367 B1 | 12/2002 | Zacharias | |
| 6,594,766 B2 | 7/2003 | Rangan et al. | |
| 7,424,437 B2 | 9/2008 | Maus et al. | |
| 7,475,045 B2 * | 1/2009 | Murashita et al. | 705/67 |
| 2003/0154405 A1 | 8/2003 | Harrison | |

(Continued)

FOREIGN PATENT DOCUMENTS

| WO | WO 2004/100083 A1 | 11/2004 |
|---|---|---|
| WO | WO 2004/100089 A2 | 11/2004 |
| WO | WO 2004100083 A1 * | 11/2004 |
| WO | WO 2004100089 A2 * | 11/2004 |

*Primary Examiner* — Michael G Lee
*Assistant Examiner* — Suezu Ellis
(74) *Attorney, Agent, or Firm* — Fenwick & West LLP (57) ABSTRACT

A smartcard using a combination of secure virtual terminal emulation implemented by the smartcard and Federated ID information stored on the smartcard (and optionally on a transaction processor server) to provide secure verification of the personal identity of the cardholder. The Federated ID information provides a high level personal identity verification for the cardholder while secure virtual terminal emulation by the smartcard prevents the Federated ID information from being exposed to the microprocessor and memory resources of a host computer station when the smartcard is used with the host computer station to engage in transactions. The Federated ID smartcard provides a flexible, dynamically adjustable, highly efficient and secure system for personal identity verification for online commerce and a wide range of other application involving personal identity verification.

6 Claims, 3 Drawing Sheets

(56) References Cited

U.S. PATENT DOCUMENTS

| | | |
|---|---|---|
| 2003/0223624 A1* | 12/2003 | Hamid .................. 382/124 |
| 2005/0232471 A1* | 10/2005 | Baer ..................... 382/115 |
| 2005/0242172 A1 | 11/2005 | Murata |
| 2006/0016877 A1 | 1/2006 | Bonalle et al. |
| 2006/0107067 A1* | 5/2006 | Safal et al. ............ 713/186 |
| 2006/0116949 A1 | 6/2006 | Wehunt et al. |
| 2007/0055630 A1 | 3/2007 | Gauthier et al. |
| 2007/0255615 A1 | 11/2007 | Lavoie et al. |
| 2008/0155269 A1* | 6/2008 | Yoshikawa ............ 713/186 |

\* cited by examiner

FEDERATED ID SECURE VIRTUAL TERMINAL EMULATION SMARTCARD

REFERENCE TO RELATED APPLICATIONS

This application is a continuation of U.S. patent application Ser. No. 12/193,646, filed Aug. 18, 2008, which claims priority to commonly-owned U.S. Provisional Patent Application Ser. No. 60/956,506, filed Aug. 17, 2007, entitled "Internet Credit Card with a Federated ID and other Online Verification Protocols Embedded on a Smart Card along with and During the Bank (Credit/Debit) Card Application for Direct Internet Transactions, Access and Payments," all of which are incorporated herein by reference.

FIELD OF THE INVENTION

This application relates to smartcards used for personal identification and financial transactions and, more particularly, to a smartcard configured for secure terminal emulation using Federated ID and personal identification information stored on the smartcard to provide personal identity verification for online transactions and other purposes.

BACKGROUND OF THE INVENTION

As online commerce and identity theft have increased, so has the need for personal identity verification and secure online commercial transactions. Preventing the theft of financial and personal information obtained from online financial transactions is an important objective. For a solution to find widespread acceptance, however, it must also be cost effective, user-friendly for consumers, efficient at the point of sale, convenient for vendors, merchants and service providers, and backward compatible with the existing bankcard infrastructure. Despite a wide range of approaches proposed to meet these objectives, none has yet taken hold to solve the continuing problems of providing an adequate level of personal identity verification and security for online commerce while also meeting the other commercially important objectives of convenience, ease of use and backward compatibility with the existing bankcard infrastructure. Accordingly, there continues to be a need for improved approaches to providing personal identity verification and security online commerce and other applications involving verification of the personal identity of persons attempting to engage in transactions.

SUMMARY OF THE INVENTION

The present invention meets the needs described above through a smartcard that emulates a secure virtual transaction terminal and uses Federated ID information stored on the smartcard to provide personal identity verification for online transactions and other purposes. The combination of secure virtual terminal emulation implemented by a smartcard and the use of Federated ID stored on the smartcard to provide secure verification of the personal identity of the cardholder is powerful because the Federated ID information provides a high level personal identity verification for the cardholder while secure virtual terminal emulation by the smartcard prevents the Federated ID information from being exposed to a host computer station when the smartcard is used with the host computer station to engage in transactions requiring personal identity verification, such as financial transactions. In this system, the Federated ID information stored on the smartcard (and optionally on a back-end transaction processor) provides a high degree of personal identity verification, while secure virtual terminal emulation performed by the smartcard prevents theft of the Federated ID information. Together, these two attributes result in a flexible, dynamically adjustable, highly efficient and secure system for personal identity verification for online commerce and a wide range of other purposes relying on personal identity verification.

In view of the foregoing, it will be appreciated that the present invention avoids the drawbacks of prior online commerce and personal identification systems by providing a smartcard that stores Federated ID information and emulates a secure virtual terminal to prevent exposure of the Federated ID information to the microprocessor and storage resources of a host computer that is used to read the smartcard. The invention also provides a dynamically adjustable personal identity validation mechanism for a wide range of application including bankcard transactions, building access systems, vehicle and equipment access systems, restricted data access systems, and other restricted access systems requiring secure validation of the personal identity of an individual seeking access to restricted resources. Specific structures and processes for implementing the invention, and thereby accomplishing the advantages described above, will become apparent from the following detailed description of the illustrative embodiments of the invention and the appended drawings and claims.

DETAILED DESCRIPTION OF THE PREFERRED EMBODIMENTS

A Federated ID smartcard uses a combination of secure virtual terminal emulation implemented by the smartcard and Federated ID information stored on the smartcard (and optionally on a transaction processor server) to provide secure verification of the personal identity of the cardholder. The Federated ID information provides a high level personal identity verification for the cardholder while secure virtual terminal emulation by the smartcard prevents the Federated ID information from being exposed to the microprocessor and memory resources of a host computer station when the smartcard is used with the host computer station to engage in transactions. The Federated ID smartcard provides a flexible, dynamically adjustable, highly efficient and secure system for personal identity verification for online commerce and a wide range of other application involving personal identity verification.

The secure virtual terminal emulation implemented by the smartcard provides security for the Federated ID and other personal identification information stored on the smartcard and thereby provides a secure and highly efficient mechanism for online third party identification and validation. The smartcard may be used for conducting secure online bankcard transactions and may also be used for personal identification validation not in connection with a financial transaction. As a result, the smartcard may be used for conducting secure online bankcard transactions and may also be used for personal identification validation in connection with any other identity-based access or transaction. For example, the smartcard can be used to provide identity verification for travel, employment, building access, computer file and data access, security clearance-based access systems, receipt of benefits, receipt of services, and other applications for which access is restricted to a particular individual who produces sufficient authenticating documentation.

Figure 1:
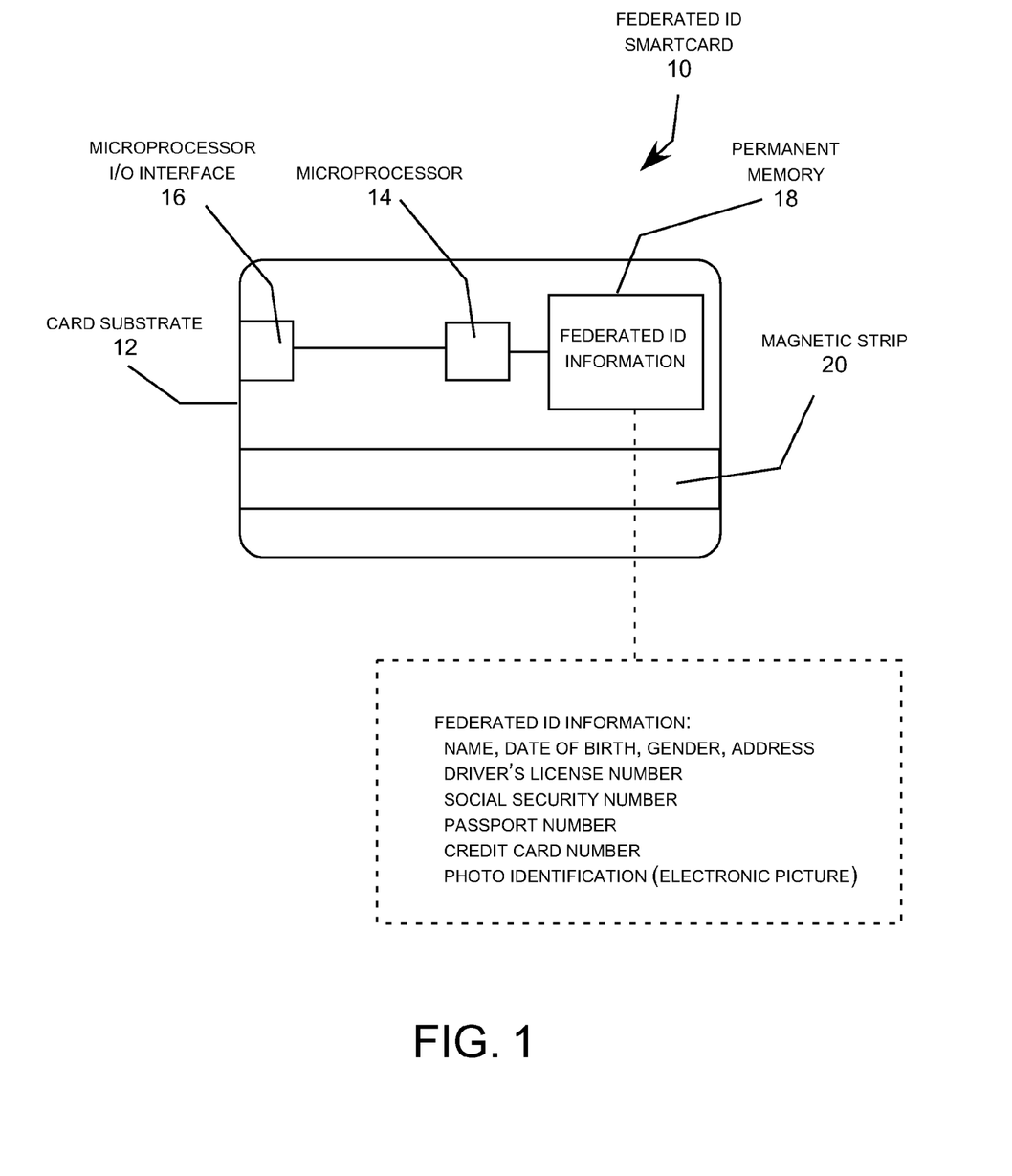
FIG. 1 is a conceptual illustration of a Federated ID secure virtual terminal emulation smartcard.

Referring to the figures, in which like numerals refer to similar elements throughout the figures, FIG. 1 is a conceptual illustration of a Federated ID smartcard 10 configured to emulate a secure virtual terminal. The smartcard is preferably implemented on durable card substrate 12, such as that used for conventional smartcards. Although a wallet-sized card is presently considered to be the preferred approach, other sizes and physical configurations may be employed, such as key-ring cards, USB thumb drives, RFID cards or other substrates, Bluetooth cards or other substrates, or any other suitable chip-carrying substrate. It should be noted that with the advent of Bluetooth and RFID technology, the federated ID smartcard technology is not limited to conventional wallet-sized cards, but can alternatively be implemented on a wide range of portable computing devices. Nevertheless, it should also be appreciated that implementing the technology on wallet-sized smartcards that are visually indistinguishable from conventional smartcards and almost visually indistinguishable from conventional bankcards is a preferred implementation with inherent advantages for immediate consumer acceptance and integration into the conventional bankcard processing system.

The illustrative wallet-sized smartcard 10 shown in FIG. 1 includes microprocessor 14, microprocessor I/O interface 16, and memory 18 similar to the resources included on conventional smartcards. The smartcard 10 also includes a magnetic strip 20 similar to that present on conventional bankcards and may further include a hologram and printed photo ID similar to those included on some conventional drivers licenses and passports. The smartcard 10 is different from these conventional items, however, in that the memory 18 includes a permanent, read-only, tamper-proof portion containing the cardholder's Federated ID information, which includes or is associated with one or more pieces of predefined personal identification information. The Federated ID information is distinguished from the information stored on conventional bankcards and smartcards in that the at least a portion of the Federated ID information is provided or verified by a third-party verification authority as being sufficient for personal identification of the cardholder for financial transaction or other purposes. That is, the Federated ID information contains encrypted personal identification credentials for the cardholder obtained or validated in advance by an appropriate third-party authority, typically involving an extended validation process. Once this information is stored on the smartcard 10, the card itself can be used as the cardholder's secure, portable, personally carried credentialing device. In addition to the type of credentialing information included in a conventional Federated ID profile, the smartcard 10 may include additional types of credentialing information for the cardholder, such as biometric identifiers and one or more secret Federated ID data items that are expected to be remembered by the cardholder and, therefore, not transmitted by mail or other media to anyone attempting to obtain issuance of a Federated ID smartcard in the name of the individual.

The Federated ID information is permanently stored in a read-only, temper-proof memory location, which may be part of a larger memory device on the smartcard or it may be a separate, special purpose memory. In either case, the smartcard should have no mechanism for the cardholder or an intruder obtaining possession of the card to read or alter the Federated ID information. For example, all or a portion of the Federated ID information may only be read or decrypted using information obtained from a back-end transaction processor after the identify of the cardholder has been validated. As an additional security measure, all or a portion of the Federated ID information may only be read or decrypted after the cardholder has entered a secret Federated ID data item that is not stored on the card itself. For example, the secret Federated ID data item may be used as a private portion of an encryption system. The cardholder's PIN or password may be used as part of an encryption key that is used to encrypt the Federated ID information without actually storing the PIN or password on the smartcard itself.

Figure 2:
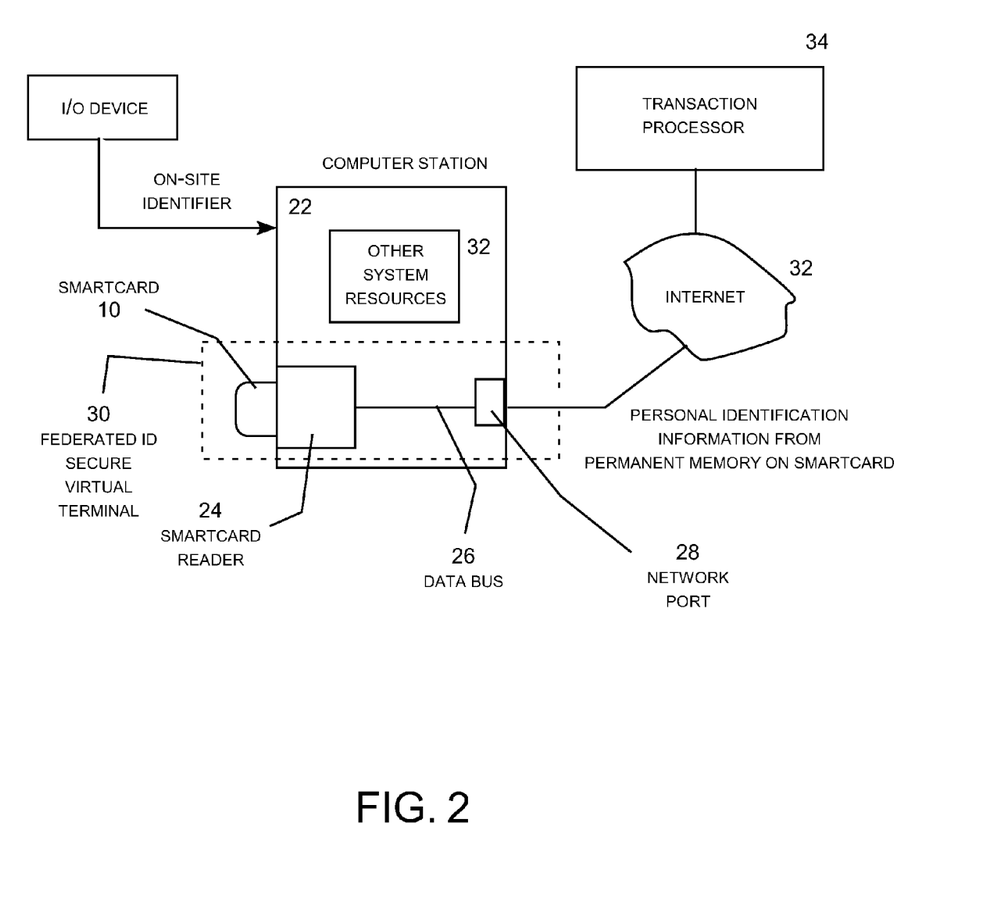
FIG. 2 is functional block diagram of an online commerce system using a Federated ID secure virtual terminal emulation smartcard.

FIG. 2 is functional block diagram of an online commerce system 20 using the Federated ID smartcard 10 and a host computer 22. The basis system architecture can be relatively simple, as shown in FIG. 2. The cardholder inserts the smartcard 10 into a smartcard reader 24 of the host computer 22. Upon activation, the smartcard launches a secure virtual terminal emulation process, which allows the microprocessor and memory resources residing on the smartcard to interact with the user input/output devices 23, data bus 26, and network interface hardware 28 of the host computer while excluding the Federated ID information from the microprocessor and memory resources of the host computer. In other words, the smartcard 10 implements a virtual terminal 30 that allows the smartcard to engage in user input-output communications and network communications without storing personal or financial information received from the user via the user input/output devices 23 or read from the smartcard 10 on the microprocessor or memory resources of the host computer 22. The user input/output devices 23 typically include a mouse and keyboard, and may further include additional devices used for personal identification of the cardholder, such as a microphone for receiving a voice signature, a writing tablet for receiving a handwritten signature, a fingerprint reader for receiving a fingerprint signature, a retina scanner for receiving a retina signature, and so forth. In this regard, the host computer 22 may be a general purpose personal computer used of online commerce, a special purpose commercial transaction terminal, or other special purpose access control device, such as a building, equipment or secure data access control system.

Once the smartcard 10 has emulated the secure virtual terminal 30, the smartcard is enabled to interact with the user (cardholder) and via the user I/O devices 23 and access the Internet 32 to access one or more transaction processors, as represented by the transaction processor 34 shown in FIG. 2, using a secure, encrypted communication protocol without exposing the cardholder's Federated ID information to the microprocessor or the memory resources of the host computer. The smartcard 10 verifies the identify of the cardholder by prompting and receiving the cardholder's PIN, password or other identification information and comparing the user-supplied identification information with corresponding identification information stored on the smartcard and, alternatively or optionally, one or more back-end transaction processors.

The host computer 22 may also notify the smartcard 10 of additional components of the user I/O devices 23 and associated identity verification protocols required to access resources controlled by the host computer. For example, the host computer 22 may notify the smartcard 10 that the host computer has an associated handwriting tablet and that access requires receipt and validation of a handwritten signature. This protocol is particularly useful, for example, for a commercial bank card check out terminal. Similarly, the host computer may notify the smartcard 10 that the host computer has an associated fingerprint reader and that access requires receipt and validation of a fingerprint signature. This protocol is particularly useful for a building or secure data access system. It should also be noted that the smartcard 10 maybe configured to detect the presence of certain types of personal identification hardware, such as fingerprint readers and handwritten signature tables, and automatically implement associated security protocols without the active involvement of the host computer microprocessor. For example, the smartcard may autonomously detect the presence of the fingerprint reader and automatically implement the fingerprint security procedures. The smartcard may also read a security protocol exposed by the host computer and implement security procedures as identified by the protocol provided by the host computer.

Figure 3:
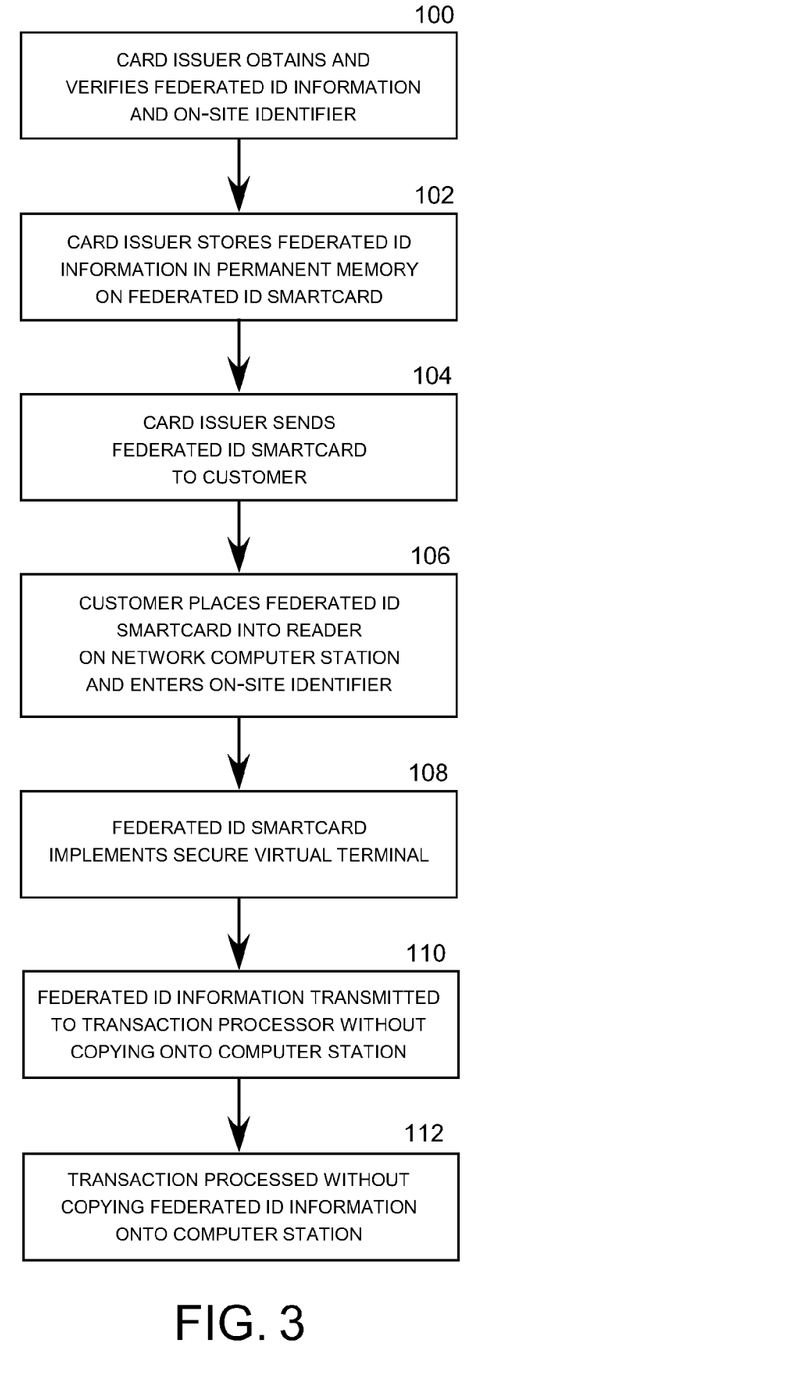
FIG. 3 is a logic flow diagram for an online commerce system using a Federated ID secure virtual terminal emulation smartcard.

To provide an illustrative example of a transaction that may be implemented by the Federated ID smartcard 10, FIG. 3 is a logic flow diagram for a transaction conducted by an online commerce system using the Federated ID smartcard. In step 100, the card issuer obtains and verifies Federated ID information for a prospective cardholder. This information includes at least one piece of personal identification information that will be used for on-site verification of the cardholder's personal identity when the cardholder attempts to used the card for personal identification. Step 100 is followed by step 102, in which the card issuer stores the Federated ID information including the personal identification information on a permanent, read-only, temper-proof electronic memory on the smartcard. At this time, the cardholder's photo identification may also be printed on the smartcard substrate and/or stored on the permanent memory of the smartcard. Step 102 is followed by step 104, in which the card issuer sends the Federated ID smartcard to the cardholder. Once the cardholder has received the smartcard, he or she may use the card to engage in secure transactions, as described below.

Step 104 is followed by step 106, in which the cardholder places the smartcard in a smartcard reader of a host computer, such as general purpose computer being used for online commerce or a commercial bankcard check out terminal. At this point, the cardholder may be required to enter an on-site launch code to initiate the secure virtual terminal. Step 106 is followed by step 108, in which the smartcard implements the secure virtual terminal emulation process. At this point, the cardholder is typically prompted to enter user-supplied personal identification corresponding to predefined personal identification information stored on the Federated ID smartcard. The specific personal identification information required may vary for different applications and may be specified by the host computer, the smartcard, and/or one or more back-end transaction processors at the time access is requested. Once the cardholder's identity has been adequately validated, step 108 is followed by step 110, in which the smartcard transmits all or a portion of the cardholder's Federated ID information to a back-end transaction processor without exposing that information to the microprocessor or memory resources of the host computer. Step 110 is followed by step 112, in which the virtual terminal (including the smartcard and the user I/O interface and network interface resources of the host computer) interact with the back-end transaction processor to complete the transaction without exposing the user's Federated ID information to the microprocessor or memory resources of the host computer.

To enable the secure access system, the Federated ID smartcard typically stores one or more items of personal identification information that are used to validate the personal identity of the cardholder when the cardholder attempts to use the smartcard for online financial transactions and other situations in which personal identification is desired. The smartcard itself, and optional one or more back-end transaction processors, store the items of personal identification information for the card holder, such as a PIN, password, electronic signature, electronic photo ID, and/or one more biometric identifiers. During a transaction requiring personal identification, the smartcard emulates a secure virtual terminal when communicating with the back-end transaction processor to prevent exposure of the personal identification information entered or read into the host computer as well as the personal identification information stored on the smartcard and/or one or more associated back-end transaction processors. The combination of the smartcard and back-end transaction processors may store a range of personal identification information that can be used to provide a dynamically adjustable range of security in personal identity verification for different types of transactions.

Importantly, the specific procedures required for personal identity verification for different types of transactions need not be stored on the smartcard itself, which stores at least a portion of the cardholder's predefined personal identification and account information sufficient to identify at least one back-end transaction processor. In particular, the Federated ID information may be stored on the read-only memory while the financial account information may be stored on the magnetic strip (optionally with another iteration of the financial account information stored on the read-only memory). The specific personal identification parameters required for each particular type of transaction can, therefore, be further defined by the on-site transaction processing equipment (e.g., host computer) and related systems and/or the associated back-end transaction processor. As a result, many different dynamically adjustable personal identification protocols may be defined and implemented without requiring changes to the information or software stored on the Federated ID smartcard itself, which can be used as a high-level personal identity security key storing a range of personal identification information for use in a wide of transactions using a wide and dynamically adjustable range of security protocols. For the purpose of this specification, it will therefore be understood that the terms "transaction" and "transaction processor" include but are not limited to financial transactions. Rather, these terms apply to any type of interaction involving verification of the personal identity of the cardholder, which are referred to generally as transactions.

In addition to providing a wide and dynamically adjustable range of personal identity verification protocols, the Federated ID smartcard also provides an efficient and highly effective mechanism for improving the security of conventional bankcard transactions, such as credit card, debit card, gift card, and defined-use financial cards. Specifically, the secure virtual terminal emulation service implemented by the smartcard prevents the financial account and routing information as well as the personal identification information (e.g., PIN, password, electronic photo ID, electronic signature) stored on the card from being exposed to the microprocessor and memory resources of the host computer during use of the card. This level of increased transaction security may be implemented without requiring any changes to the back-end financial transaction processor. In addition, storing the Federated ID information on the smartcard provides a level of personal identification documentation presently accomplished only through a detailed and time consuming validation process, typically requiring the presentation of photo identification along with a passport or social security number, and in some cases requiring additional information such as financial account and password information. The Federated ID smartcard provides a significantly higher level of personal identity validation without risking loss of the personal identification information through the host computer. Moreover, the cardholder is not required to carry, remember or otherwise provide personal information other than the particular information required for on-site verification, which can be as simple as a PIN, may also include a secret Federated ID data item, and may be much more involved, for example requiring multiple biometric identifiers validated by the smartcard itself as well as multiple back-end transaction processors. Notwithstanding the potential sophistication of the system, the ability of the Federated ID smartcard to validate the cardholder's personal identity using a simple PIN (and, if desired, other identifiers stored on the smartcard) without involvement of the back-end transaction processor in the personal identification process is an important advantage that allows the Federated ID smartcard to be seamlessly and incrementally introduced into the existing bankcard infrastructure without requiring any changes to the bankcard infrastructure other than introduction of the Federated ID smartcard itself.

This innovation allows the Federated ID smartcard to be used with any host computer without creating an entry point for security breach and theft of the user's financial and personal information, as occurs with conventional online transaction systems. This is because in conventional online transaction systems, the resources of the host computer, including the microprocessor and associated memory residing on the host computer, are used to store, process and communicate the cardholder's financial and personal information with the back-end transaction processor. This typically involves typing or electronically reading the financial and personal information into a browser running on the host computer, which stores this information in a variety of locations. Some of these locations are not exposed to the user (cardholder), who may be unaware that the host computer is storing this information. This exposes the information to loss through spyware, hacking, and other types of computer intrusion. Although browser cookies are a well known mechanism for storing this type of information on the host computer, the information may also be stored in other locations that are less well known and more difficult to eradicate, such as Internet temporary files, cache memory, registry keys, and the like. In addition, computer thieves are notoriously adaptive, continually finding new ways to bypass computer security systems, such as Trojan horses, web crawlers, spyware, and so forth.

In previous Internet commerce systems, the cardholder's personal and financial information used to engage in financial transactions is necessarily exposed to the host computer's microprocessor and memory resources as these resources are used to receive and transmit this information to the back-end transaction processor. The Federated ID smartcard avoids this exposure by using the microprocessor and memory resources resident on the smartcard to receive and transmit the cardholder's financial and personal information to the back-end transaction processor. This is possible because the Federated ID smartcard carries its own microprocessor, memory, user interface software, and network interface software. When the smartcard is read by a smartcard reader of the host computer, the microprocessor and related resources residing on the smartcard operates as a secure virtual terminal that uses the input-output and network interface resources of the host computer while excluding the Federated ID information from the microprocessor and memory resources of the host computer. This process, which is referred to as secure virtual terminal emulation, prevents the cardholder's personal and financial information used to engage in transactions (e.g., the Federated ID information stored on the smartcard) from being read or otherwise entered into the microprocessor and memory resources of the host computer. As a result, the browser, temporary Internet files, and registry keys implemented by the host computer are not used to interact with the input-output and network interface resources of the host computer during virtual terminal emulation. Rather, the microprocessor and memory resources residing on the smartcard interact with the input-output and network interface resources of the host computer to create the secure virtual terminal emulation computing environment.

Secure virtual terminal emulation by the Federated ID smartcard therefore allows the resources of the host computer to be used to receive user-supplied personal identification, such as a PIN, password, fingerprint signature, and so forth, without that information being stored on the memory resources or processed by the microprocessor of the host computer. Instead, the smartcard receives and stores the user-supplied personal identification information, which the smartcard typically validates by comparing the user-supplied personal identification information with corresponding, predefined personal identification information stored on the smartcard. Alternatively or optionally, the smartcard and/or a back-end transaction processor may validate some or all of the user-supplied personal identification by comparing that information with corresponding, predefined personal identification stored on one or more back-end transaction processors. Importantly, the personal identity of the cardholder is validated through the secure virtual emulation process in which the smartcard communicates with the back-end transaction processor, which prevents the user-supplied personal identification, the predefined personal identification information stored on the smartcard, and the personal identification information stored in one or more back-end transaction processors from being exposing to the microprocessor and memory storage resources of the host computer.

It should be noted at this point that the host computer can be any host computer with direct or indirect access to a smartcard reader. For example, the cardholder can use any personal computer with a smartcard reader to engage in financial transactions without risking exposure and potential loss of personal identification information to or through the host computer. This includes the personal identification information stored on the smartcard as well as that entered into the smartcard and communicated with the back-end transaction processor using the input-output and network interface resources of the host computer. Similarly, the host computer may be a transaction terminal operated by a vendor. In this case, the transaction terminal or an associated resource (e.g., network accessed security computer associated with the transaction terminal) may define the type of personal identification validation required for the specific cardholder and transaction requested. As anther example, the host computer may be a transaction terminal providing restricted access to a building, vehicle, computer file, or other resource. Again for these applications, the transaction terminal or an associated resource may define the type of personal identification validation required for the specific cardholder and transaction requested. In this manner, a wide range of dynamically adjustable security and personal identity validation protocols may be implemented using the Federated ID smartcard without requiring any change to the personal identification information or software stored on the card itself.

The Federated ID information stored on the smartcard may includes typical identification information, such as the cardholder's name, gender, date of birth, physical description, address, driver's license number, passport number, social security number and electronic picture ID. The Federated ID information may also include financial account verification, such as account numbers existing or previously associated with the subject person. Other information, such as the subject's present or historical telephone number or a personal encryption key may also be included for identity verification purposes. The Federated ID information should also include one or more parameters that the cardholder will be expected to provide at the time of card use to validate his or her identity. This should include at least a PIN or similar date item to be entered by the cardholder in order to use the card for financial or other transactions requiring validation of the cardholder's identity. Many other types of personal identification information may also be employed, some of which may be stored only on the card, only on a back-end transactions processor, or at both locations. Storing the personal identification on a back-end processor as well as the smartcard itself provides a level of security against counterfeit smartcards in that an intruder cannot create a counterfeit smartcard by creating and storing new personal identification information solely on a smartcard because the personal identification information stored on the smartcard must correspond to the predefined personal identification also stored in the subject's Federated ID profile on the back-end transaction processor.

In addition, different back-end processors implementing different transactions in concert with the smartcard may store different items of personal identification. This allows the smartcard to store a wide range of personal identification information used for a wide range of transactions. For example, the personal identification information may include a PIN, password, electronic signature, electronic photograph, secret Federated ID data item, and a range of biometric identifiers, such as electronic fingerprint signature, electronic voice signature, electronic retina signature, and so forth. For high-security applications, such as financial transactions in excess of $10,000 or access to information, premises or equipment requiring a high-level security clearance, the back-end transaction processor may also require a secret Federated ID data item that is not stored on the smartcard 10 itself. Similarly, the smartcard 10 may require the cardholder to enter a secret Federated ID data item that is stored on the smartcard 10, but not transmitted to the cardholder after initial creation of the cardholder's Federated ID profile. Thus, a person desiring issuance of a Federated ID smartcard in the name of a particular subject must know the requisite secret Federated ID data item or go through the process of establishing a new Federated ID profile with all of the associated credentialing and verification processes.

To provision the smartcard, the smartcard issuer typically obtains validation of the personal identification information through a third party validation service. Federated ID represents any type of well defined protocol or credentials for validating personal identification information. The smartcard issuer stores the validated personal identification information (referred to as Federated ID information) in permanent memory on the smartcard, delivers the smartcard to the cardholder, and activates the card for financial transaction purposes. The cardholder may conduct a bankcard transaction or identification verification process online by inserting the smartcard into a local computer connected to the Internet and entering the on-site personal identifier using the input-output resources of the local computer.

Upon validating that the correct on-site personal identifier (or multiple personal identifiers, as desired) has been entered, the smartcard acts as a virtual bankcard terminal that delivers the validated Federated ID personal identification information from the permanent memory on the smartcard to a back-end, network-accessed transaction processing computer. Importantly, the Federated ID personal identification is delivered to the network transaction processing computer without storing a copy of the validated personal identification information on the host computer (i.e., the local computer comprising the smartcard reader into which the smartcard has been inserted). This is enabled by the smartcard emulating a secure virtual terminal using the microprocessor and memory resources residing on the smartcard rather than those residing on the host computer. In this manner, the smartcard uses the network interfacing resources of the host computer to access the network transaction processing computer, but does not otherwise store the Federated ID information on microprocessor or memory resources residing on the host computer. This avoids, for example, storing the Federated ID information on the host computer's cache memory or entering it into a browser or other software running on the host computer's microprocessor, which could allow the Federated ID information to be stored in cookies or local temporary files, or transmitted to another location by a spyware resident on the host computer.

While the on-site personal identifiers are entered into the local host computer using the input-output resources of the host computer, the personal identifiers stored on the smartcard are never read into or accessed by the host computer. This prevents theft, contamination, tampering or spoofing of the personal identifiers stored on the smartcard. The advantage over prior smartcard systems is tremendous because the present system does not exposes the microprocessor or memory resources of the host computer to the Federated ID information stored on the smartcard or the personal identification information entered by the cardholder using the local computer.

To implement the Federated ID smartcard system, bankcards, with traditional bank and credit products, will be issued with a smartcard chip, including but not limited to contact and contact-less such as RFID (radio frequency identification) input/output ports, along with the traditional bank magnetic strip currently accompanying all bankcards. The bankcard magnetic strip carries routing and other information required for bank transaction including ATM, debit/credit/stored-value/gift, or any other types of bankcard transactions used in the traditional closed bankcard system. The chip on the smartcard carries bank routing and other information required for the same bank transactions, which may be used in the traditional closed EMV bankcard (chip based) system in conjunction with Federated ID information for secured online access and/or transactions.

The issuing bank will independently verify the cardholder's persons identity at the time of issuing the Federated ID smartcard and permanently embedded key data fields required for Federate ID verification protocols for online access and transactions. The chip on the card will also give the cardholder the ability to add credit card information for routing payments for online purchases. The information on the card-chip will contain the Federated ID online identification rules where the critical information for the Federated ID will be verified by and through the tradition credit and banking verification process prior to issuance of the smartcard.

Upon verifying a person's identity required to issue the credit card, the ID fields will be loaded on the chip in a manner that will satisfying the applicable online requirements for controlled access, processing, and purchases. This online requirement for independent third party verification, referred to as Federate ID, will insure authentication of the cardholder's identity in a manner acceptable to the card issuer and other participants in the wider financial industry. Additional private information could also be added such as Driver License numbers, bank account numbers, Insurance information etc. when such personal ID verification is required for online access and transaction.

The cardholder can add additional routing information for payment using other financial accounts once the Federated ID smartcard has been issued. For example, after receiving the Federated ID smartcard for use with an initial financial account, the cardholder may add additional bankcards information, such as a Sears, VISA card, Exxon Card, any other affinity card that carry the same "name" as is embedded on the Federated ID smartcard by inserting the card into a host computer and following predefined instructions, which are typically provide with the card and published through a website associated with the card.

For online purchases, unlike solutions such as PayPal, which imposes a surcharge up to 1.9% to the merchant over and above the traditional bankcard transaction fee (3%), with the Federated ID smartcard the consumer would be closer to a more traditional fee because this card effectively turns the cardholder's personal computer into a secure financial transaction terminal. That is, the Federated ID smartcard effectively turns any host computer from a more the open internet platform into a secure banking platform for conducting secure bankcard transactions.

A single Federated ID smartcard may be configured to access multiple financial accounts having different account numbers and routing codes and thereby replace multiple bankcards, which is referred to as "multi card storage." The purpose of multi card storage is to first secure Internet transactions through issuance of the Federated ID smartcard along with advanced encryption technologies and corresponding procedures. The first major advance is accomplished by issuance of the Federated ID smartcard the Federated ID information permanently stored on to the chip and secure virtual terminal functionality enabled by the smartcard. The Federated ID information includes at least the identity information required to issue the bankcard. When purchasing on line the smart card, card reader and the computer together act much like a retail bankcard terminal. The online merchant is assured that the card is together with the owner. The Federated ID on the card functions much like presenting unrelated third party ID right online, similar to the type of identity validation that occurs when a cardholder presents a physical ID verification such as a driver license along with a credit card when conducting an in-person transaction. Additionally, the Federated ID smartcard will enable online secured access for non-financial transactions requiring unrelated third party verification using the same process used for online bank transactions. The Federated ID on the smart card will therefore be useful for a wide variety of financial and non-financial transactions involving personal identity verification of eh cardholder.

It will therefore be appreciated that the Federated ID smartcard is far superior to traditional bankcards for online commerce. As the market increases for the Federated ID smartcard, smartcards and smartcard readers will be increasingly deployed and used in traditional bankcard terminals such as ATM's and merchant terminals. As cardholders migrate multiple accounts onto their Federated ID smartcards to obtain the associated security and convenience benefits for multiple accounts, the cardholder will be able to see a list of all of the accounts serviced by the Federated ID smartcard on a display screen and select among the accounts for particular transactions. This will allow the cardholder to see the list of financial accounts and direct particular charges to particular selected accounts charge, as well as make other bank/credit request, account access, transfers, withdrawals and so forth for multiple accounts using a single Federated ID smartcard.

The Federated ID information and other personal identification information will preferably be permanently posted on the smartcard, thereby creating a powerful new electronic credentialing source for the cardholder. The Federated ID information generally includes a significant base of non-hanging or very infrequently changing information, such as the cardholder's name, birth date, gender, physical description, social security or passport number, place of birth, etc. and other personal identification information that may be used to Identify the cardholder. The Federated ID information is stored on the chip (microprocessor) resident on the smartcard, the smartcard is under the control of the cardholder, and the Federated ID information stored on the smartcard is not copied onto the memory of the host computer. That is, when the smartcard is inserted into a smartcard reader connected to a host computer, the microprocessor residing on the smartcard emulates a secure virtual terminal that prevents any of the Federated ID data from being downloaded from the smartcard or copied onto the RAM and/or ROM on the host computer. As a result, on the host computer side of the network, only the smartcard itself stores the Federated ID information when the smartcard is used to conduct financial transactions. Therefore, Federated ID information stored on the smartcard remains secure during online transactions, thus minimizing the ability for information to be hacked from the host computer. During these transaction, the chip residing on the smartcard talks directly to a back-end transaction processor with encrypted communications, which allows the smartcard to identify the cardholder, allow authorizations, routing appropriate payments as directed by the cardholder, much like the magnetic strip and PIN numbers identify an individual and allows directed financial transaction with merchants, service providers ATM's etc.

The Federated ID smartcard issuer obtains and validates personal identification information for the prospective cardholder from the customer and third party sources, such as banks and bankcard issuers (i.e. credit/debit card) and/or third party validation services, such as Lexis-Nexis. The authorized cardholder's personal identification information typically includes name, date of birth, social security number, gender, residence, telephone number, passport number, driver's license number, photo identification, etc. For a financial smartcard, the financial account numbers, routing codes and other financial account information for one or more financial accounts authorized for use by the cardholder is also stored on the smartcard. For cardholder authentication purposes, the smartcard issuer also creates or obtains one or more on-site personal identifiers, such as a PIN, hand-written signature, one or more personal encryption key or key, one or more passwords, cardholder photograph, and/or biometric identifier, such as a finger print, retina print or other biometric information.

The personal identification information may be, in whole or in part, assigned by the card issuer, assigned by a third party authentication service, and received from the cardholder. Some or all of the on-site personal identifiers are typically (but need not necessarily be) stored on the card itself. In addition, some or all of the on-site personal are typically (but need not necessarily be) also stored on a back-end authenticating computer system. In addition, one or more of the personal identifiers, such as a personal data item created separate from or prior to issuance of the smartcard, may be stored on the card and the back-end computer system but not otherwise transmitted to the person requesting issuance of the card. For example, a person's Federated ID profile may contain one or more secret personal data keys created at the time the person's Federated ID record is initially established. This secret Federated ID personal data key(s) assigned to a particular person may thereafter be required to use or obtain issuance of a Federated ID smartcard in the name of that particular person. The secret Federated ID personal data key(s) may be stored only on a back-end server, or it may only be stored on the card itself, or it may be stored in both locations as desired. In addition, two different potentially related personal data key items (e.g., mother's first and last maiden names, first three and last four digits of a telephone number, and so forth) may be stored on the card and on the back-end server. However, the secret Federated ID personal data key(s) are something that the cardholder is expected to know from memory and is therefore not included on paperwork sent along with or in association with the issuance of the card.

The cardholder is typically required to present one or more of the on-site personal identifiers when attempting to use the card. The user's identity is then verified at the location of card use by comparing personal identifier(s) received from the cardholder at the location of use to the corresponding personal identifier(s) stored on the smartcard and/or those stored on the back-end transaction processing computer system. To use the cardholder's photo as an example, a photograph of the face of the authorized cardholder may be visibly printed on the card, stored on an electronic memory on the smartcard, and stored on a back-end server. Depending on the level of authentication desired at the point of card use, the authenticating party (e.g., vendor accepting the card for payment, bank cashing a check for the cardholder, airline clerk issuing a plane ticket to the cardholder, and so forth) may verify the identity of the cardholder by comparing the appearance of the cardholder to one or more of (a) the visible photo of the authorized cardholder printed on the card, (b) the digital photo of the authorized cardholder stored on the electronic memory residing on the card displayed on a terminal visible to the authorizing party, and (c) the digital photo of the authorized cardholder stored on the back-end computer system displayed on a terminal visible to the authorizing party.

In the same or similar manner (excluding perhaps the presence of printed indicia corresponding to the authorized cardholder's photo visibly printed on the card), the same or a similar procedure can be used with other types of personal identifiers (e.g., fingerprint, retina scan, PIN, password, etc.) instead of or in addition to using the cardholder's photo ID for authentication purposes. The Federated ID smartcard thereby may provide up to three levels of identification authentication (i.e., indicia printed on card, indicia stored on memory resident on card, and indicia stored on a back-end transaction processor), and may use multiple types of identification information to perform identify authentication at the point of card use. Different types of identification information representing different levels of authentication security may therefore be implemented for different purposes. For example, simple visual authentication using the photo ID printed on the card may be appropriate for building access, whereas visual authentication using the photo ID printed on the card together with handwritten signature authentication performed by comparing a signature obtained at the point of card use with an electronic signature stored on the memory resident on the card may be required to use the card for financial transactions. For financial transactions in excess of $10,000, for example, the cardholder may be required to input the correct secret Federated ID data item. As another example, fingerprint authentication performed by comparing an electronic fingerprint obtained at the point of card use with an electronic fingerprint stored on the memory resident on the card may be required for access to computer files, whereas further comparison with a fingerprint signature stored on a back-end transaction processor may be required for access to highly restricted premises or materials. The examples may go on an on, for example by requiring an authenticated retina scan for access to a secured portion of a building, or as another example by requiring an authenticated fingerprint scan to operate a vehicle, such as an expensive automobile, aircraft or yacht, or obtain access to certain premises, equipment or information. Of course, the security regimes may change as needed or desired. Importantly, the Federated ID smartcard (together with the back-end server, as desired) provides a convenient device where different types of authentication information is stored. The way in which this information is required, obtained, compared and otherwise used at the time to card may therefor be defined by the authenticating location or system.

For any of these security regimes, which can be dynamically changed and augmented as needed, the personal identifiers stored on the smartcard itself and those stored an the back-end system may be validated individually or in combination. As a result, higher level authentication involving the retrieval of confirmatory personal identifiers for the back-end server may take longer, and therefore may be reserved for infrequent applications where higher level, more time consuming security is appropriate. Similarly, simple visual authentication and signature validation using an electronic signature stored on the card will be quite simple and fast, which may be appropriate for access requiring a lower level of security, such as routine building access, vehicle access, and financial transactions.

Security and convenience is significantly improved over prior security systems through the use of Federated ID information stored on the smartcard and secure virtual terminal emulation by the smartcard. These features are particularly important for providing a secure online commerce system. In view of the foregoing, it will be appreciated that present invention provides significant improvements in secure commercial transactions and personal identification verification systems and that numerous changes may be made therein without departing from the spirit and scope of the invention as defined by the following claims.

The invention claimed is:

1. A smartcard configured for secure personal identification of an associated cardholder authorized to use the smartcard, comprising:
   a portable substrate carrying a machine-readable magnetic memory strip, a microprocessor, a microprocessor interface, and a read-only memory;
   wherein the microprocessor interface is configured for engaging in functional communications with a smartcard reader associated with a host computer having user input-output resources, network interface resources, microprocessor resources, and memory resources;
   wherein the read-only memory residing on the smartcard stores identification information for the associated cardholder;
   wherein the microprocessor residing on the smartcard is configured to:
      validate a personal identity associated with the cardholder; and
      transmit at least a portion of the identification information to a back-end transaction processor via the network interface resources of the host computer while excluding the at least a portion of the identification information from the microprocessor and memory resources of the host computer; and wherein the microprocessor residing on the smartcard is configured to emulate a secure virtual terminal in which the smartcard controls the network interface resources of the host computer.

2. The smartcard of claim 1, wherein the smartcard is configured to receive user-supplied personal identification information from the cardholder via the user input-output resources of the host computer while excluding the user-supplied personal identification information from the microprocessor and memory resources of the host computer.

3. The smartcard of claim 2, wherein the smartcard is configured to validate the personal identity of the cardholder by comparing the user-supplied personal identification information to corresponding predefined personal identification information stored on the read-only memory of the smartcard.

4. The smartcard of claim 3, wherein the user-supplied personal identification information comprises a PIN and the predefined item of identification information stored on the read-only memory residing on the smartcard comprises a predefined PIN.

5. The smartcard of claim 3, wherein the user-supplied personal identification information comprises an electronically received handwritten signature and the predefined item of identification information stored on the read-only memory residing on the smartcard comprises a predefined handwritten signature.

6. The smartcard of claim 3, wherein the user-supplied personal identification information comprises an electronically received biometric signature and the predefined item of identification information stored on the read-only memory residing on the smartcard comprises a predefined biometric signature.

* * * * *